(12) United States Patent
Gervais et al.

(10) Patent No.: US 9,826,677 B2
(45) Date of Patent: Nov. 28, 2017

(54) SEED IMPLEMENT INCORPORATING A DOWN PRESSURE SENSING AND ADJUSTMENT SYSTEM

(71) Applicant: CNH Industrial Canada Ltd., Saskatoon, Saskatchewan (CA)

(72) Inventors: Joel Gervais, Saskatoon (CA); James W Henry, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 360 days.

(21) Appl. No.: 14/571,603

(22) Filed: Dec. 16, 2014

(65) Prior Publication Data

US 2016/0165789 A1    Jun. 16, 2016

(51) Int. Cl.
 *A01C 7/08* (2006.01)
 *G05B 15/02* (2006.01)
 *A01C 7/20* (2006.01)
 *A01C 7/10* (2006.01)

(52) U.S. Cl.
 CPC ............ *A01C 7/205* (2013.01); *A01C 7/105* (2013.01)

(58) Field of Classification Search
 CPC ........... A01C 7/08; A01C 5/062; A01C 7/205; G05B 15/02
 See application file for complete search history.

(56) References Cited

U.S. PATENT DOCUMENTS

| | | | |
|---|---|---|---|
| 3,136,371 A | 6/1964 | Rau et al. | |
| 3,433,307 A | 3/1969 | Gilbert | |
| 3,658,133 A | 4/1972 | Sweet et al. | |
| 3,749,035 A | 7/1973 | Cayton et al. | |
| 3,844,357 A | 10/1974 | Ellinger | |
| 4,031,963 A | 6/1977 | Poggemiller et al. | |
| 4,064,945 A | 12/1977 | Haney | |
| 4,145,980 A | 3/1979 | Boots | |
| 4,176,721 A | 12/1979 | Poggemiller et al. | |

(Continued)

FOREIGN PATENT DOCUMENTS

| | | |
|---|---|---|
| EP | 0057571 B1 | 12/1984 |
| EP | 0170351 A2 | 2/1986 |

(Continued)

*Primary Examiner* — Thomas Lee
*Assistant Examiner* — Chad Erdman
(74) *Attorney, Agent, or Firm* — Rebecca L. Henkel; Rickard K. DeMille

(57) ABSTRACT

Data is collected from sensors related to the opener assembly for seeders, such as for discs and hoe drills, in order to better determine how the opener assembly reacts while operating in various conditions and to more precisely control operation of the opener assembly. Accordingly, a control system and a sensor array are utilized to provide automatic and continuous down pressure adjustments (according to a certain user specified range) at various speeds to substantially maintain a relatively constant seed depth. The sensor array could also be monitored and controlled by an operator to control settings (such as with respect to seed depth and/or opener down pressure) of the seeding implement from the cab to provide manual down pressure adjustments at various speeds. In various aspects, seeding speed and/or tractor speed may also be parameters controlled via the sensor feedback according to a certain user specified range of sensor variation.

18 Claims, 8 Drawing Sheets

(56) References Cited

U.S. PATENT DOCUMENTS

| | | | |
|---|---|---|---|
| 4,300,638 A | 11/1981 | Katayama et al. |
| 4,354,555 A | 10/1982 | Lang |
| 4,355,688 A | 10/1982 | Hamm et al. |
| 4,413,685 A | 11/1983 | Gremelspacher et al. |
| 4,495,577 A | 1/1985 | Strunk et al. |
| 4,579,038 A | 4/1986 | Winter |
| 4,600,060 A | 7/1986 | Winter et al. |
| 4,646,620 A | 3/1987 | Buchl |
| 4,913,070 A | 4/1990 | Morrison, Jr. |
| 5,653,292 A | 8/1997 | Ptacek et al. |
| 5,684,691 A | 11/1997 | Orbach et al. |
| 5,931,882 A | 8/1999 | Fick et al. |
| 6,076,611 A | 6/2000 | Rozendaal et al. |
| 6,085,846 A | 7/2000 | Buchl et al. |
| 6,144,910 A | 11/2000 | Scarlett et al. |
| 6,164,385 A | 12/2000 | Buchl |
| 6,216,794 B1 | 4/2001 | Buchl |
| 6,389,999 B1 | 5/2002 | Duello |
| 6,547,012 B2 | 4/2003 | Scarlett et al. |
| 6,640,468 B2 | 11/2003 | Menze |
| 6,701,857 B1 | 3/2004 | Jensen et al. |
| 7,028,554 B2 | 4/2006 | Adamchuk et al. |
| 7,686,095 B2 | 3/2010 | Batthala et al. |
| 7,870,826 B2 | 1/2011 | Bourgault et al. |
| 7,938,074 B2 | 5/2011 | Liu |
| 7,975,630 B2 | 7/2011 | Bourgault et al. |
| 8,061,282 B2 | 11/2011 | Borland |
| 8,078,367 B2 | 12/2011 | Sauder et al. |
| 8,235,130 B2 | 8/2012 | Henry et al. |
| 8,275,525 B2 | 9/2012 | Kowalchuk et al. |
| 8,380,356 B1 | 2/2013 | Zielke et al. |
| 8,386,137 B2 | 2/2013 | Sauder et al. |
| 8,448,717 B2 | 5/2013 | Adams et al. |
| 8,522,889 B2 | 9/2013 | Adams et al. |
| 2007/0272134 A1 | 11/2007 | Baker et al. |
| 2010/0198529 A1 | 8/2010 | Sauder et al. |
| 2010/0318841 A1 | 12/2010 | Lin et al. |
| 2010/0319941 A1 | 12/2010 | Peterson |
| 2011/0184551 A1* | 7/2011 | Kowalchuk ............ A01C 7/105 700/219 |
| 2011/0282556 A1 | 11/2011 | Klenz et al. |
| 2011/0313575 A1 | 12/2011 | Kowalchuk et al. |
| 2012/0186503 A1 | 7/2012 | Sauder et al. |
| 2012/0227992 A1 | 9/2012 | Henry |
| 2012/0232691 A1 | 9/2012 | Green et al. |
| 2012/0237083 A1* | 9/2012 | Lange ................ G06K 9/00805 382/103 |
| 2012/0255475 A1 | 10/2012 | Mariman et al. |
| 2013/0032362 A1 | 2/2013 | Rylander |
| 2013/0032363 A1 | 2/2013 | Curry et al. |
| 2013/0104785 A1 | 5/2013 | Achen et al. |
| 2013/0112121 A1 | 5/2013 | Achen et al. |
| 2013/0112123 A1 | 5/2013 | Turko et al. |
| 2013/0112124 A1 | 5/2013 | Bergen et al. |
| 2013/0138289 A1 | 5/2013 | Sauder et al. |
| 2013/0197767 A1 | 8/2013 | Lenz |
| 2013/0248214 A1 | 9/2013 | Adams et al. |
| 2014/0124227 A1* | 5/2014 | Sauder .................. A01C 7/205 172/2 |
| 2014/0214284 A1* | 7/2014 | Sauder .................. A01C 7/205 701/50 |

FOREIGN PATENT DOCUMENTS

| | | |
|---|---|---|
| EP | 0372901 | 2/1994 |
| EP | 0838139 B1 | 8/2003 |
| EP | 0838141 B1 | 12/2003 |
| EP | 1169902 B1 | 2/2007 |
| EP | 2193352 | 6/2010 |
| EP | 2510768 A1 | 10/2012 |
| EP | 2554036 A1 | 2/2013 |
| EP | 2554037 A1 | 2/2013 |
| EP | 2497348 A1 | 6/2013 |

\* cited by examiner

SEED IMPLEMENT INCORPORATING A DOWN PRESSURE SENSING AND ADJUSTMENT SYSTEM

FIELD OF THE INVENTION

The present invention relates generally to ground opener units for an agricultural implement, and in particular, to a seed implement incorporating a down pressure sensing and adjustment system for cutting an elongated trench in the soil.

BACKGROUND OF THE INVENTION

Agricultural seed planters typically produce one or more furrows, or narrow grooves made in the ground, for planting seeds in rows. Upon producing a furrow, the seed planter will typically meter and deposit seeds into the furrow at approximate intervals to balance a maximum number of plants in a planting row with a minimum spacing between plants for optimal growth and harvesting.

Upon depositing seeds in a furrow, seed planters will typically drag soil from behind to close the furrow using a soil closing system. Then, seed planters will typically press the dragged soil downward, onto the covered furrow, using a soil pressing system, in order to maximize contact between deposited seeds and soil and ensure soil stability for plant growth.

The depth at which an opener, such as a disc or other ground engaging tool, penetrates into the field and cuts the furrow may be controlled, for example, by a gauge wheel. The position of the gauge wheel is typically set by rotating a lever or control arm to one of a series of depth setting positions. While the gauge wheel sets the penetration depth for the opener, a down pressure system, which typically includes a hydraulic cylinder, applies a down force on the opener to ensure that the opener penetrates into the ground. For most planters, the amount of down force can be adjusted by the operator to accommodate different soil conditions. Due to factors that affect seeding performance, such as rocks, obstacles, saline areas, and the like, it is a challenge to substantially maintain a constant seeding depth while traveling at various speeds.

What is needed is an improved down pressure control system for automatically and continually adjusting the down pressure applied to one or more openers in response to changes in soil conditions to maintain a relatively constant penetration depth so that the one or more openers may cut an elongated trench in the soil at a substantially constant depth at various speeds.

SUMMARY OF THE INVENTION

Data is collected from sensors related to the opener assembly for seeders, such as for discs and hoe drills, in order to better determine how the opener assembly reacts while operating in various conditions and to more precisely control operation of the opener assembly. Accordingly, a control system and a sensor array are utilized to provide automatic and continuous down pressure adjustments (according to a certain user specified range) at various speeds to substantially maintain a relatively constant seed depth. The sensor array could also be monitored and controlled by an operator to control settings (such as with respect to seed depth and/or opener down pressure) of the seeding implement from the cab to provide manual down pressure adjustments at various speeds. In various aspects, seeding speed and/or tractor speed may also be parameters controlled via the sensor feedback according to a certain user specified range of sensor variation.

Down pressure adjustment automation could also be implemented using automation systems. For example, an ISOBus Class 3 (ISO11783) interface, a standardized tractor-to-Implement Interface whose specifications are published, could be used to communicate feedback and control adjustments.

Sensors may detect and/or measure a variety of characteristics, including frame acceleration, opener acceleration, frame angle, shank angle, hydraulic pressure, and/or loads or forces, such as between the gauge wheel and ground. Accordingly, sensors may provide corresponding outputs. Sensor types may include, for example, accelerometers, inclinometers, load cells, and the like. In addition, a control system may be used which ties in the sensors with a controller and feedback from an operator in the cab.

The operator may set a desired depth and down force on a seeding implement. Sensors are attached to the seeding implement, such as in and around the opener assembly. In operation, the sensors relay their readings to the controller, and an operator may monitor and/or adjust the depth and/or down force settings of the implement. Sensor readings relayed to the controller may be operable to automatically adjust the depth and/or down force settings based on user settings. Data may be relayed via a bus to an Electronic Control Unit (ECU) or Universal Control Module (UCM) on the implement which transmits data to the tractor and user.

In addition, multiple sensors on a single opener assembly, as well as on the toolbar, may allow for increased resolution of the opening operation. Relating data collected from the opener and the frame, such as comparing parallel link and rockshaft inclinometer readings, frame and shank accelerometer readings, and so forth, may provide a better determination of how the opener, in isolation, is reacting in the field, thereby allowing improved adjustment and control. Accordingly, aspects of the invention may provide an improved determination of how the machine is operating, optimization of seed depth and opener down pressure, and the ability for automation of system.

Other aspects, objects, features, and advantages of the invention will become apparent to those skilled in the art horn the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

Figure 1:
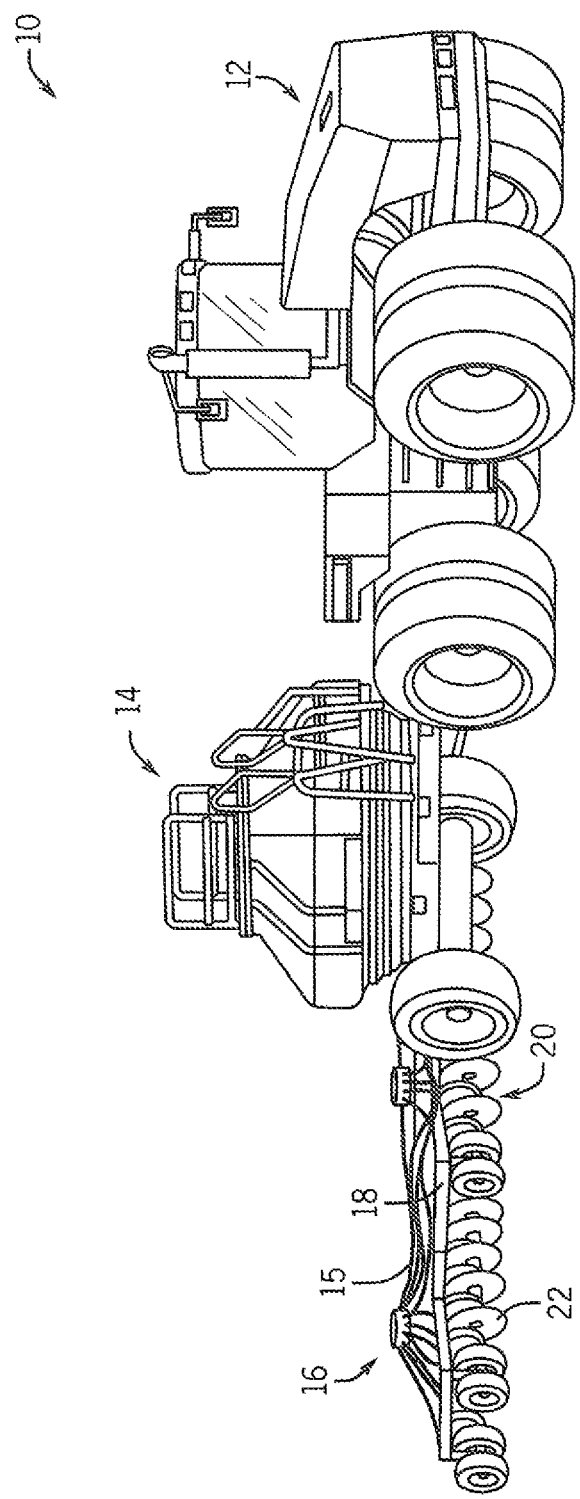
FIG. 1 is an isometric view of an agricultural system including a tractor, an air cart, and an implement in accordance with the present invention.

Referring generally to the drawings, and more particularly to FIG. 1, an exemplar agricultural seeding system 10 including a down pressure sensing and adjustment system 310 in accordance with the present invention is shown. Agricultural seeding system 10 includes a tractor 12, an air cart 14, and an agricultural implement, such as a seed implement or drill 16. The air cart 14 and the drill 16 may be hitched to the tractor 12 in a conventional manner. The drill 16 may include a tool bar 18 to which a row unit 20 is coupled. By way of example, row unit 20 may include a set of disc-style openers 21. Each disc-style opener 21 includes a disc 22 designed to cut a furrow into the soil. The air cart 14 pneumatically delivers seed and/or fertilizer to a set of delivery tubes 15 of the drill 16 whereupon the seed and/or fertilizer are deposited in seed trenches or furrows cut by the discs 22. The drill 16 includes a hydraulic system incorporating a network of hydraulic cylinders, valves, and conduits that are flow-coupled to a hydraulic fluid source, typically carried by the tractor 12. The hydraulic system is operable to perform various functions associated with operation of the drill 16. For example, the drill 16 may be moved between a raised, transport position and a lowered, field engaging position by a hydraulically controlled down pressure assembly. For folding implements, the hydraulic system can also be used to fold the drill 16 to have a narrow profile, which is better suited for transport and storage.

Figure 2:
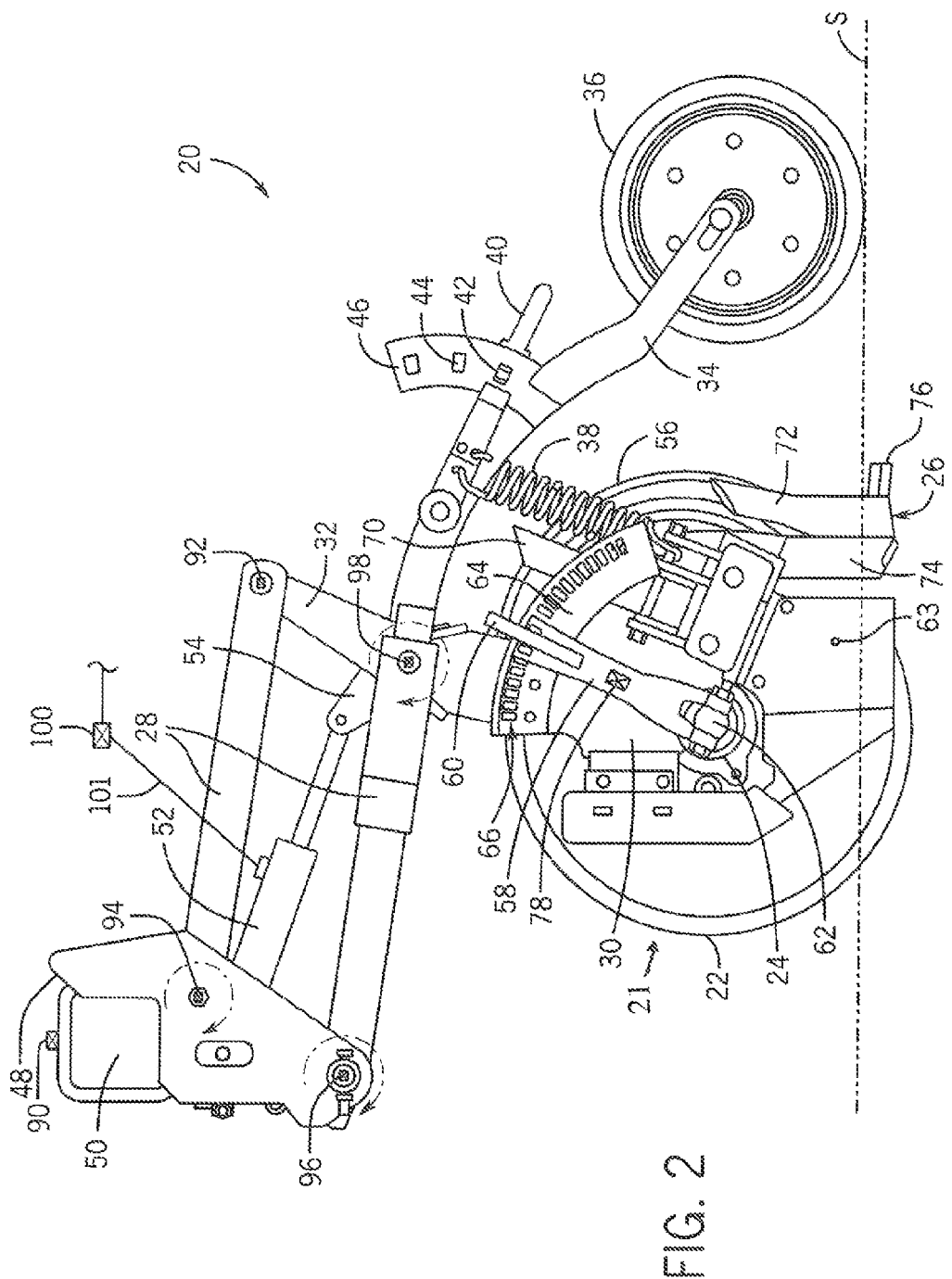
FIG. 2 is a side elevation view of a row unit of the implement of FIG. 1 with a sensor array.

Referring to FIG. 2, the row unit 20 includes a forward disc 22 that is angled relative to a line of travel. The forward disc 22 rotates about a center huh 24 to cut a furrow into a planting surface, "S." A seed boot 26 is mounted rearward of the disc 22, and follow the furrow formed by the disc 22 and deposit seed therein. The row unit 20 is coupled to a parallel linkage 28 by a disc mount 30, to which a mount arm 32 is welded and extends upwardly therefrom. A trailing arm 34 is also coupled to the parallel linkage 28 and a press or packing wheel 36 is coupled to the trailing arm 34. The press or packing wheel 36 trails the disc 22 and the seed boot 26, and applies a packing pressure to the furrow. The packing force is applied by spring 38, but it is understood that other biasing devices may be used. In addition, the amount of packing force can be varied via lever 40 which has a selector member 42 that can be selectively positioned in one of a series of notches 44 of curved member 46.

The parallel linkage 28 is also coupled to a toolbar mount 48 that is operative to couple the row unit 20 to a toolbar 50 of the drill 16. A hydraulic cylinder 52 is pivotably coupled to the toolbar mount 48 and the mount arm 32 by a bracket 54. The cylinder 52 is operative to apply a downward pressure on the disc 22 to force the disc 22 to penetrate the seeding surface S. The depth at which the disc 22 cuts into the planting surface is variably set by a gauge wheel 56 and a cooperating gauge wheel arm 58 having a handle 60. The arm 58 is coupled to a crankshaft 62 that extends through the center of the disc 22. The gauge wheel arm 58 is held in place by teeth (not shown) that interface with a mating fan shaped member 64, which includes a series of notches 66 that individually define a different depth the disc 22 can be set via positioning of the gauge wheel arm 58. In addition to setting the depth at which the disc 22 cuts into the planting surface, the gauge wheel 56 keeps the outer surface of the disc 22 generally clear of mud and debris. A scraper blade 63 is mounted opposite the depth gauge wheel 56 is designed to remove dirt, mud, and other debris from the inner surface of the disc 22.

The row unit 20 shown in FIG. 2 is a single pass, double-shoot unit. In this regard, the unit 20 is designed to cut a furrow, drop fertilizer, cut a seed trench, and drop seed in a single pass across the planting surface. In this regard, a fertilizer tube 70 is mounted rearward of the center huh of the disc 22 but forward of the seed boot 26. The seed boot 26 generally includes a seed tube 72 and a cutting member 74 that is forward of the seed tube 72. In operation, as the disc 22 forms a furrow having a relatively deep fertilizer trench in the planting surface, fertilizer is dropped into the fertilizer trench from a fertilizer source (not shown) that communicates with the aforementioned fertilizer tube 70. The cutting member 74 is offset from the disc 22 and cuts into a sidewall of the furrow to form a ledge or seed bed. Seed is then dropped via the seed tube 72 onto the ledge. The seed is fed to the seed tube 72 from a seed source.

The cutting member 74 cuts into the sidewall of the furrow such that the ledge is offset horizontally and vertically from the fertilizer trench, i.e., bottom of the furrow. In this regard, the seed is deposited at a position that is spaced horizontally and vertically from the fertilizer that is dropped into the fertilizer trench. As noted above, it, is generally preferred to place seed and fertilizer into a furrow with stratification between the fertilizer and the seed.

In one aspect, the cutting member 74 maybe angled to lift the soil as the cutting member 74 is urged through the sidewall of the furrow. Thus, as the disc 22 and the cutting member 74 cut through the planting surface, the soil may be temporarily displaced and lifted, to form trenches for the deposition of fertilizer or seed. However, when the disc 22 and the cutting member 74 pass, the soil may tend to fall back onto itself and effectively fill-in the furrow and thus the fertilizer and seed trenches. The press or packing wheel 36, which trails the seed boot 26, then packs the fertilizer and the seed. Alternately, the cutting member 74 may be angled downward to force the soil down onto the fertilizer before the seed is deposited onto the seed bed.

In one aspect, a deflector tab 76 may extend from the backside of the seed tube 72. The deflector tab 76 generally provides two separate functions. First, the deflector tab 76 is angled as is the lower ends of the seed tube 72 and the cutting member 74. With this angled orientation, the deflector tab 76 is operative to encourage seed toward the seed trench. Second, because of its proximity to the seed tube 72, the deflector tab 76 reduces the ingress of soil and debris into the seed tube 72 during roll back of the planting unit 20.

As noted above, the pressure in the hydraulic cylinder 52 sets the amount of down pressure that is applied on the disc 22. In one aspect of operation, a user rotates the gauge wheel arm 58 to a desired depth setting at which the disc 22 is to cut a furrow in the planting surface. The down pressure applied by the cylinder 52, together with the weight of the row unit 20, forces the disc 22 into the planting surface so that the furrow is cut at the user selected depth. In an alternative arrangement, multiple openers could be ganged together via a rockshaft which rotates and compresses a spring on the individual openers.

Figure 7:
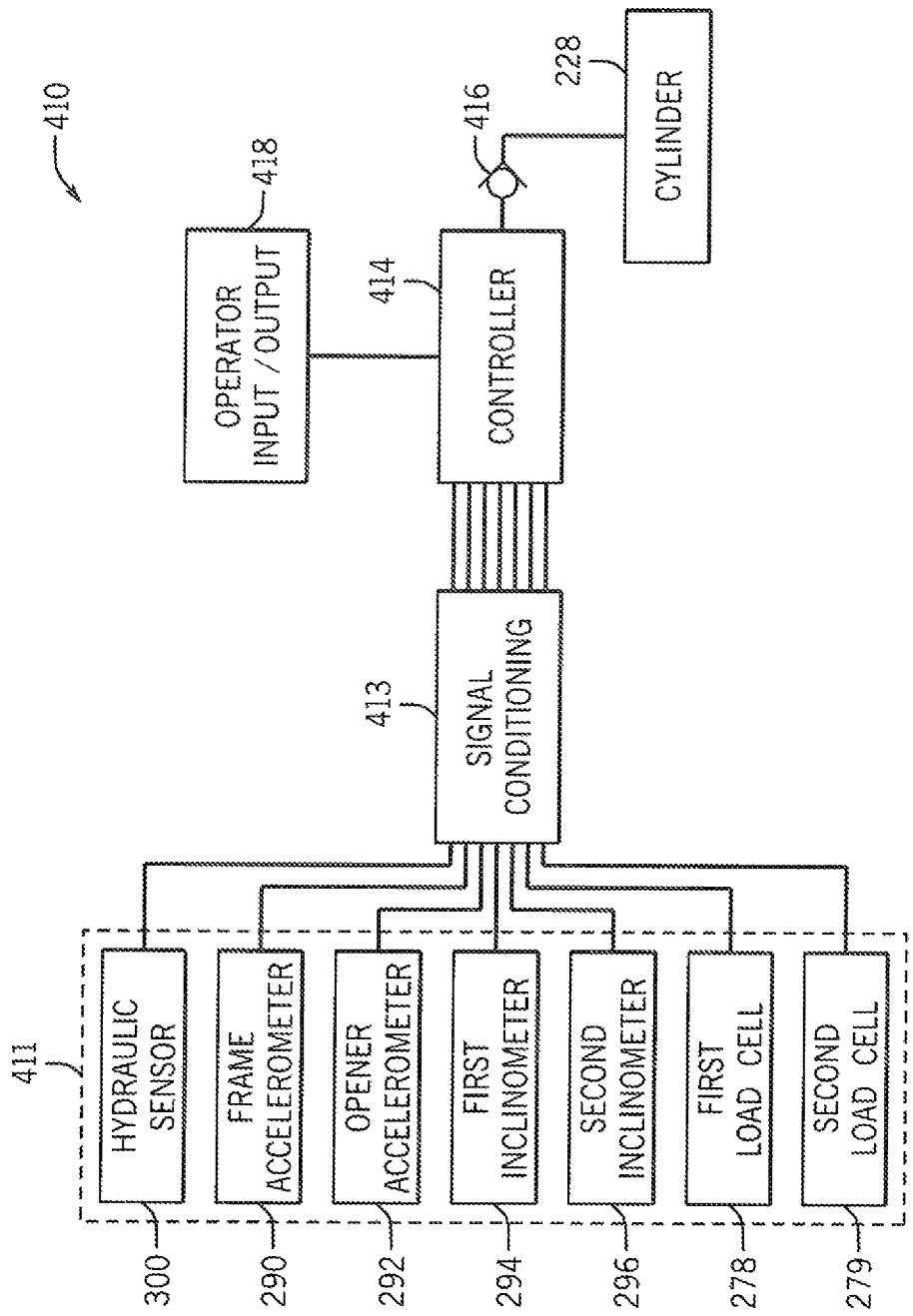
FIG. 7 is a schematic diagram of a down pressure adjustment circuit having a sensor array for use with the agricultural system of FIGS. 4-6.

With, additional reference to the schematic diagram of FIG. 7, a control system for controlling/adjusting the hydraulic down pressure force on the disc 22 of a corresponding row unit 20 is generally designated by the reference number 310. The control system 310 includes a sensor array 311 having one or more sensors (e.g. a load cell 78, a frame accelerometer 90, an opener accelerometer 92, first, second and/or third inclinometers 94, 96, 98, and/or a hydraulic sensor 100, as hereinafter described). It is intended for the information sensed by the sensor array 311 to be used by the controller 314 to control the flow of hydraulic fluid to or from the hydraulic cylinder 52, and thus, the amount of down pressure force applied on the disc 22. More specifically, the amount of down force applied by the hydraulic cylinder 52 is substantially controlled by the controller 314 to maintain a desired seed depth and furrow formation without overstressing the gauge wheel and its related components at a variety of travel speeds conventional for an implement and under a variety of field conditions.

As hereinafter described, each sensor of the sensor array 311 provides a corresponding electrical output signal to an optional signal conditioning circuit 313, then, in turn, to a controller 314. The optional signal conditioning circuit 313 may provide electrical signal amplification, buffering, analog to digital conversion, and/or any other functionality to properly condition such electrical signals for use by the controller 314. The controller 314 may be a microprocessor, microcontroller, central processing unit (CPU), field programmable gate array (FPGA), programmable logic device (PLD), application specific integrated circuit (ASIC), or any other processing capable element. The controller 314 receives the electrical output signals and determines whether to open or close a valve 316 as needed to adjust pressure in the cylinder 52 (or other hydraulic cylinders applying down pressure in alternative disc opener arrangements, such as where a cylinder applies pressure to a gang of multiple openers to compress an individual spring connected to each opener an individual spring connected to each opener), and hence, the hydraulic down pressure force on the disc 22 of a corresponding row unit 20. It understood that the controller 314 could also provide monitoring and control capability to an operator located in the cab, such as a driver of the tractor 12, by sending the sensor array information to an input/output module 318 in the cab (such as a display), and receiving commands from the input/output module 318 in the cab (such as dials). Accordingly, the operator may set a desired depth and down force for the disc 22.

It is contemplated for the sensor array 311 of control system 310 to detect and/or measure a variety of characteristics, including frame acceleration (which may indicate overall bounce of the implement), opener acceleration (which may indicate overall bounce of a specific opener; for example, a higher bounce may require more down pressure to decrease bounce up to a maximum specified down force), frame angle (which may indicate when an opener is in transport or field position; for example, in a gang style orientation for a disc opener, this will give an indication of how much the spring is being compressed), shank angle (which may indicate opener movement in field position, such as going through a dip, valley, hitting a pothole, or the like), hydraulic pressure (which may indicate opener down pressure being applied), and/or loads or forces (which may indicate, for example, actual load on a disc, knife, gauge wheel, or packer wheel on the opener), such as between the gauge wheel and ground, and supply the corresponding signals to a controller 314. It can be appreciated that the agricultural system of the present invention may include other sensors without deviating from the scope of the present invention. By way of example, the sensor array 311 includes a strain gauge or load cell 78 is mounted to gauge wheel arm 58. The load cell 78 may take the form of a transducer which generates an electrical signal whose magnitude is proportional to a physical force or strain being exerted on the gauge wheel arm 58. The electrical signal generated by load cell 78 may be provided directly to controller 314 or passed through an optional signal conditioning circuit 313, as heretofore described, prior to receipt by the controller 314.

The sensor array 311 also includes a frame accelerometer 90 mounted to the toolbar 50. The frame accelerometer 90 generates an electrical signal whose magnitude corresponds to the acceleration of the frame of the drill 16 relative to the Earth's surface. The electrical signal generated by frame accelerometer 90 may be provided directly to controller 314 or passed through an optional signal conditioning circuit 313, as heretofore described, prior to receipt by the controller 314. Similarly, an opener accelerometer 92 is mounted to the parallel linkage 28, proximal to the mount arm 32. The opener accelerometer 92 generates an electrical signal whose magnitude corresponds to the acceleration of the opener or disc 22 relative to the Earth's surface. The electrical signal generated by opener accelerometer 92 may be provided directly to controller 314 or passed through an optional signal conditioning circuit 313, as heretofore described, prior to receipt by the controller 314. The frame accelerometer 90 and/or the opener accelerometer 92 may be conventional single axis accelerometers for detecting the magnitude and direction of the acceleration along a single axis or a multi-axis accelerometer for detecting the magnitude and the direction of acceleration along multiple axes. Accordingly, detected acceleration may correspond to a "bounce" of the unit (frame or opener) as it travels.

A first inclinometer 94 of sensor array 311 is mounted at the pivot connection between an upper link 28a of the parallel linkage 28 and the toolbar mount 48. The first inclinometer 94 generates an electrical signal corresponding to the angle of the upper link 28a relatively to the toolbar mount 48. The electrical signal generated by the first inclinometer 94 may be provided, directly to controller 314 or passed through an optional signal conditioning circuit 313, as heretofore described, prior to receipt by the controller 314.

A second inclinometer 96 of sensor array 311 is mounted at the pivot connection between a lower link 28b of the parallel linkage 28 and the toolbar mount 48. The second inclinometer 96 generates an electrical signal corresponding to the angle of the lower link 28b relatively to the toolbar mount 48. In an alternative aspect with ganged openers and a rockshaft, the second inclinometer 96 may be mounted on the rockshaft which is connected to the multiple disc opener assemblies. The electrical signal generated by the second inclinometer 96 may be provided directly to controller 314 or passed through an optional signal conditioning circuit 313, as heretofore described, prior to receipt by the controller 314.

A third inclinometer 98 of sensor array 311 is mounted at a pivot connection between the lower link 28b of the parallel linkage 28 and the mount arm 32. The third inclinometer 98 generates an electrical signal corresponding to the angle of the lower link 28b relatively to the mount arm 32. The third inclinometer 98 can give an indication, for example, of how much movement there is in the packing wheel, as well as the motion of the disc opener itself. The electrical signal generated by the third inclinometer 98 may be provided directly to controller 314 or passed through an optional signal conditioning circuit 313, as heretofore described, prior to receipt by the controller 314. It can be appreciated that the angular measurements of the first, second and third inclinometers 94, 96 and 98, respectively, allow controller 314 to calculate the precise geometric positions of the various interconnected structural elements of row unit 20.

A hydraulic sensor 100 of sensor array 311 is connected to the cylinder 52 via pressure line 101. The hydraulic sensor 100 may take the form of a hydraulic force transducer which, generates an electrical signal whose magnitude is proportional to the hydraulic down pressure force being exerted by cylinder 52 on the disc 22. The electrical signal generated by the hydraulic sensor 100 may be provided directly to controller 314 or passed through an optional signal conditioning circuit 313, as heretofore described, prior to receipt by the controller 314.

In operation, an operator sets the gauge wheel 56 to a desired seed depth and sets the hydraulic down pressure force being exerted by cylinder 52 on the disc 22 to a desired value based on experience and field conditions. As the seeder or planter 16 is initially lowered into the field engaging position and the planter units 20 begin to cut furrows into the planting surface, the load cell 78, the frame accelerometer 90, the opener accelerometer 92, the first, second and third inclinometers 94, 96 and 98, respectively, and the hydraulic sensor 100 of sensor array 311 provide feedback to the controller 314 via electrical output signals from the various sensors, as heretofore described. The controller 314 analyzes the sensor data from the electrical output signals received to determine if adjustment of the hydraulic down pressure force being exerted by cylinder 52 on the disc 22 is required. Flaying multiple sensors of varying types may allow for more resolution of the opener operation. Generally, if the amount of down pressure applied by the cylinder 52 is excessive, the hydraulic down pressure force being exerted by cylinder 52 on the disc 22 will force the disc 22 farther into the planting surface, or force too much pressure on the gauge wheel which can deform the furrow being created by the opener, thereby resulting in deformation, e.g., slight bending, of the gauge wheel arm 58. This deformation of the gauge wheel arm 58 is detected by one or more of the various sensors, such as the load cell 78. On the other hand, if the down pressure applied by the cylinder 52 is insufficient to hold the disc 22 at the desired furrow cutting depth, a reverse bending of the gauge wheel arm 58 will occur and be detected by the one or more various sensors, such as the load cell 78.

In this regard, as the disc 22 is pulled through the planting surface, the various sensors provide the controller 314 with the electrical output signals, as heretofore described. The controller 314 compares the sensor data from the electrical output signals to a range of "no-action" values. That is, if the amount of strain, acceleration, angle or pressure falls sensed within the range of "no-action" values set for the particular sensor, then the controller 314 will not effectuate a change to the amount of the hydraulic down pressure force being exerted by cylinder 52 on the disc 22

However, if the amount of strain, acceleration, angle or pressure falls sensed by the various sensors are outside the range of "no-action" values, the controller 314 will adjust, e.g., increase or decrease, the hydraulic down pressure force being exerted by cylinder 52 on the disc 22. The range of "no action" values is of sufficient size to avoid the constant changing of the hydraulic pressure exerted by cylinder 52, but avoids undesirable over-force or under-force on the disc 22.

It is contemplated to initially set the hydraulic down pressure force being exerted by cylinder 52 on the disc 22 to a maximum. The load cell 78, the frame accelerometer 90, the opener accelerometer 92, the first, second and third inclinometers 94, 96 and 98, respectively, and the hydraulic sensor 100 provide feedback to the controller 314 via electrical output signals from the various sensors, as heretofore described, as the disc 22 is pulled through the planting surface. The hydraulic down pressure force being exerted by cylinder 52 on the disc 22 is reduced from the maximum level as appropriate based on feedback received by controller 314 from the various sensors. For example, if controller 314 determines that the angle sensed by one or more of the first, second and third inclinometers 94, 96 and 98 exceeds a threshold, the hydraulic down pressure force being exerted by cylinder 52 on the disc 22 is reduced accordingly. By initially setting the hydraulic down pressure force being exerted by cylinder 52 on the disc 22 to a maximal level and then reducing the down pressure force as needed, two advantages are provided. First, it ensures that there is initially enough down pressure force for the disc 22 to cut through the planting surface to the desired cutting depth. Second, the reduction of the down pressure force can be done relatively quickly to provide a quickened response time to achieve an optimized down pressure force setting for a given soil condition.

Figure 4:
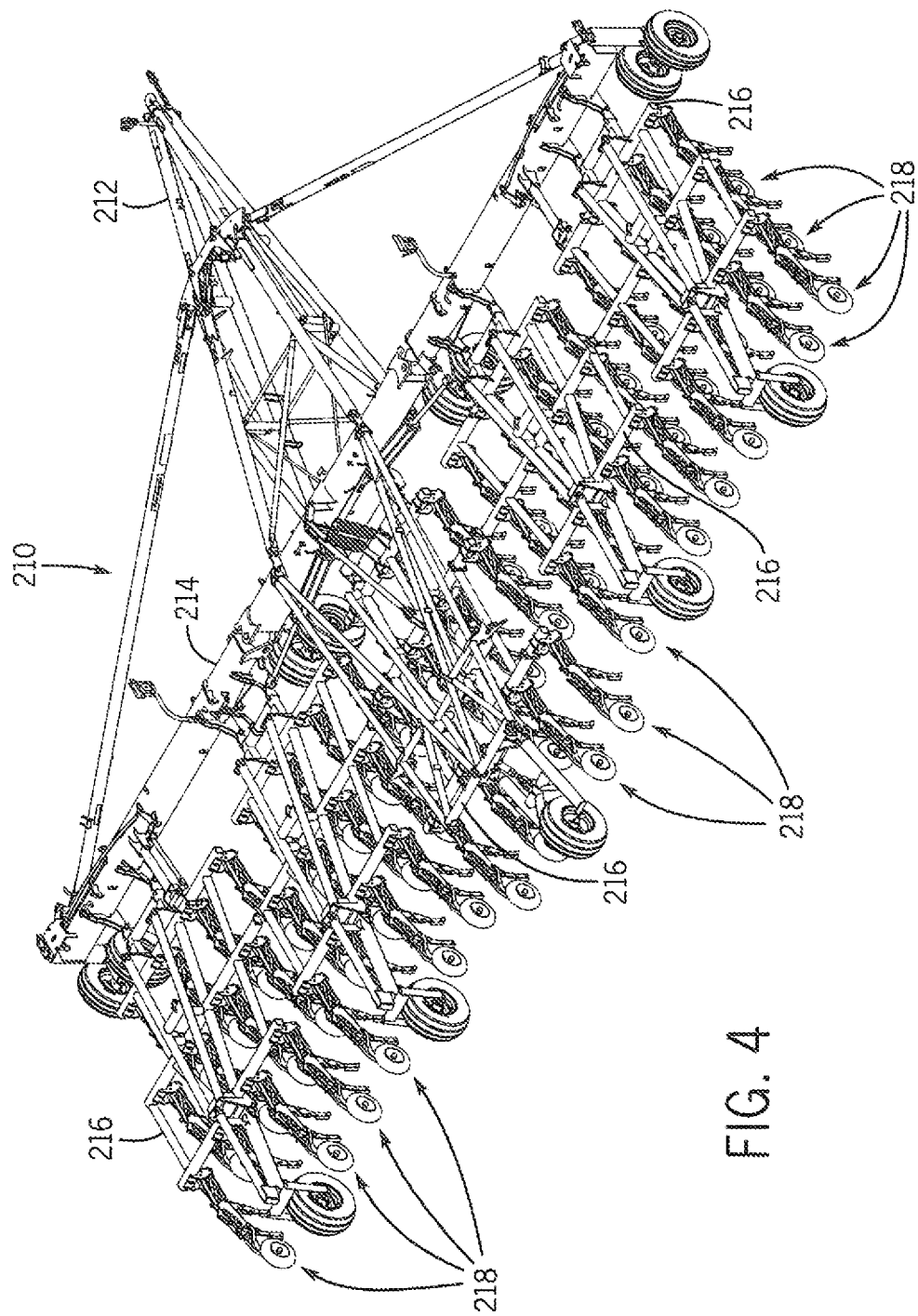
FIG. 4 is an isometric view of an alternate implement in accordance with the present invention.

Turning now to FIG. 4, an alternate agricultural implement 210 incorporating a down pressure sensing and adjustment system in accordance with the present invention is shown. Agricultural implement 210 is intended to be towed behind a work vehicle such as a tractor. The agricultural implement 210 includes a tow bar assembly 212 which is shown in the form of an A-frame hitch assembly. The tow bar assembly 212 may include a hitch used to attach to an appropriate tractor hitch via a ball, clevis, or other coupling. The tow bar assembly 212 is coupled to a tool bar 214 which supports multiple tool frames 216. Each tool frame 216 includes multiple seeding implements, such as the illustrated row units 218 with hoe-type openers 219. As discussed in detail below, each row unit 218 includes a depth adjustment assembly configured to facilitate rapid reconfiguration of the hoe-type openers 219 for varying penetration depths.

Figure 5:
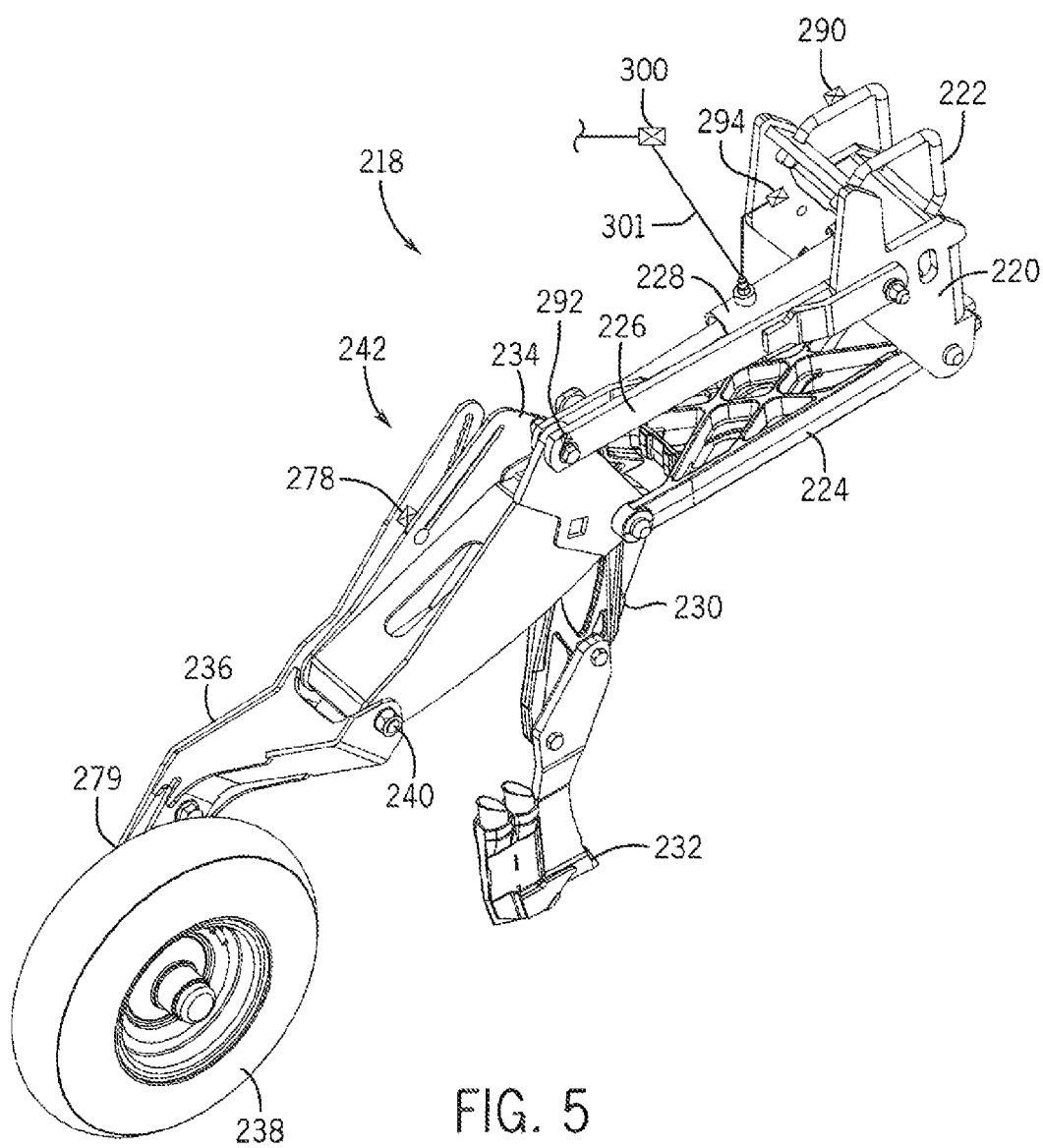
FIG. 5 is an isometric view of a row unit of the implement of FIG. 4 with a sensor array.
Figure 6:
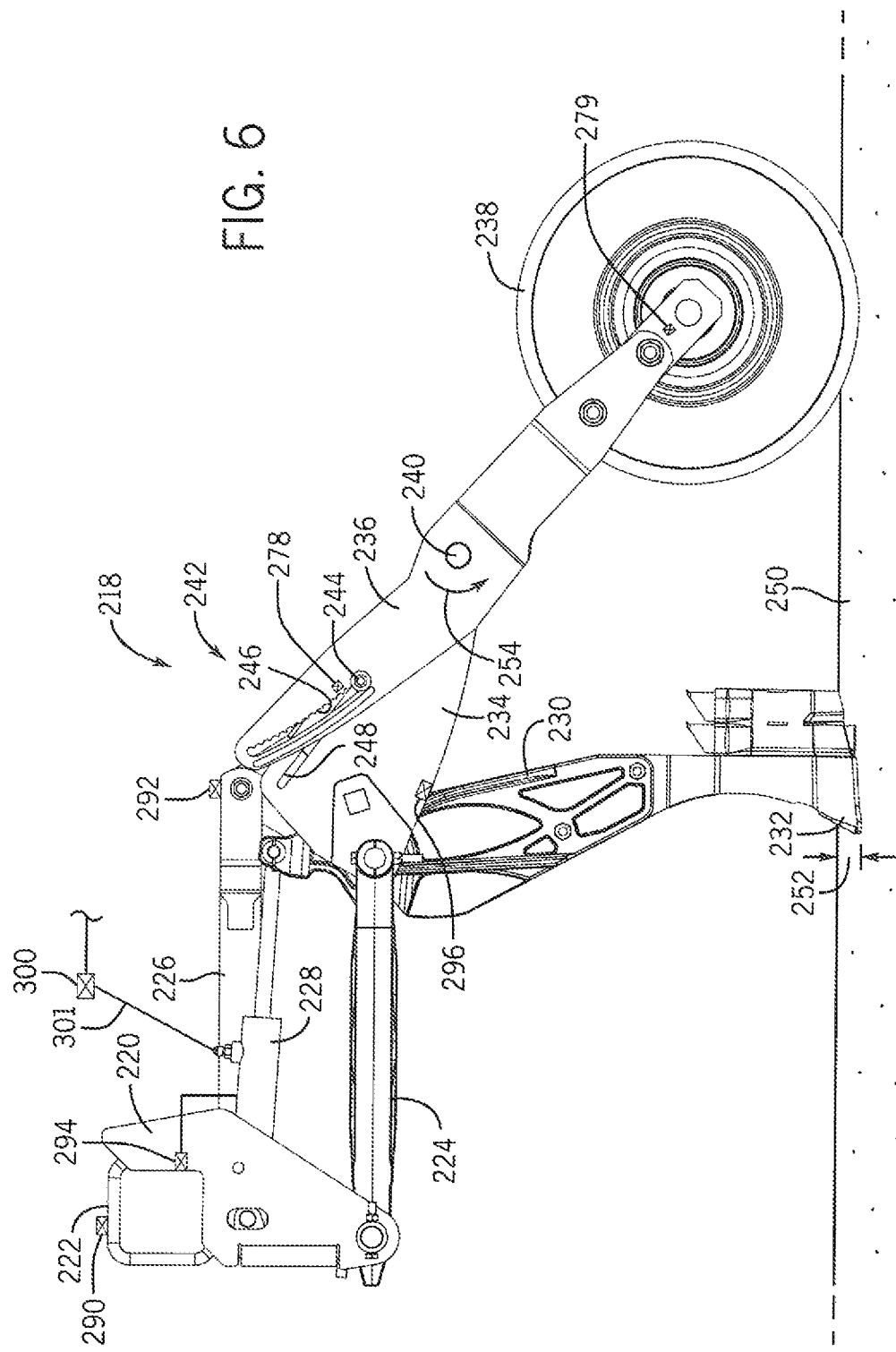
FIG. 6 is a side view of the row unit of FIG. 5.

Referring to FIGS. 5-6, the row unit 218 includes a frame support 220, mounting brackets 222, a first member 224, a second member 226, and a biasing device such as a cylinder 228 (which may be a hydraulic and/or pneumatic piston-cylinder assembly). The cylinder 228 may be hydraulically coupled to a power supply that provides a flow of pressurized hydraulic fluid which displaces a piston rod extending from the cylinder. The frame support 220 and the frame bracket 222 are configured to interface with the tool frame 216, thereby securing the row unit 218 to the agricultural implement 210. For instance, multiple row units 218 may be mounted in parallel along the tool frame 216. As illustrated, the first member 224, the second member 226, and the frame support 220 form elements of a parallel linkage, also known as a four bar linkage. As will be appreciated, components of the row unit 218, such as the frame support 220, mounting brackets 222, first member 224, and second member 226, may be made of any suitable material, such as steel.

The cylinder 228 is attached to a shank 230 via a pin at the end of the piston rod. A ground engaging tool, such as the illustrated opener 232, is also interconnected to the shank 230 and configured to engage the soil. Contact force between the opener 232 and the soil establishes a moment about a shank pivot joint. This moment is resisted by force applied to the shank 230 by the cylinder 228. Furthermore, the linkage is configured to facilitate vertical movement of the agricultural implement 210, while maintaining the opener 232 at a desired penetration depth within the soil. As illustrated, the linkage is coupled to a packer support structure 234, such as the illustrated packer support plate.

A packer arm 236, including a packer wheel 238, is pivotably coupled to the packer support structure 234. The packer wheel 238 rotates along the soil surface to both pack the soil on top of deposited seeds and limit the penetration depth of the opener 232. As illustrated, a pin 240 disposed through openings within the packer arm 236 and the packer support structure 234 enables rotation of the packer arm 236 with respect to the packer support structure 234. However, in a working mode, rotation of the packer arm 236 relative to the packer support structure 234 is blocked by a depth adjustment assembly 242. The depth adjustment assembly 242 includes a fastener 244, a slot 246 within the packer arm 236, and a slot 248 within the packer support structure 234. The fastener 244 is movable within the slots 246 and 248 to adjust the penetration depth 252. Specifically, movement of the fastener 244 along the slots 246 and 248 will cause the packer arm 236 to rotate about the pin 240 in the direction 254. As the packer arm 236 rotates, the vertical position of the opener 232 varies with respect to the packer wheel 238. Because the packer wheel 238 is configured to rotate across the top of the soil 250, varying the vertical position of the opener 232 with respect to the wheel 238 varies the penetration depth 252 of the opener 232 within the soil 250.

In a locked position, the location of fastener 244 is fixed and blocks rotation of the packer arm 236 with respect to the packer support structure 234. Conversely, in an unlocked position, the fastener may be translated within slots 246 and 248 to adjust the rotational position of the packer arm 236 about the pin 240. Such an adjustment varies the vertical position of the opener 232 relative to the packer wheel 238, thereby altering the penetration depth of the opener 232. Once a desired penetration depth has been established, the fastener 244 is locked into position, thereby limiting rotation of the packer arm 236 and enabling the row unit 218 to enter the working mode. As previously discussed, the packer wheel 238 rotates across a surface of the soil to limit the penetration depth of the opener 232. Consequently, the difference in vertical position between the packer wheel 238 and the opener 232 defines the penetration depth of the opener 232 within the soil. Because the fastener 244 remains disposed within the slots 246 and 248 during the adjustment process, the penetration depth of the opener 232 may be varied more rapidly than configurations that require removal of the fastener 244 to reposition the packer arm 236. It can be appreciated that the depth 252 of the opener 232 may be selected based on soil conditions, seeds, or environmental factors, among other considerations.

With additional reference to the schematic diagram of FIG. 7, a control system for controlling/adjusting the hydraulic down pressure force on the opener 232 of a corresponding row unit 218 is generally designated by the reference number 410. The control system 410 includes a sensor array 411 having one or more sensors (e.g. a load cell 278, a second load cell 279, a frame accelerometer 290, an opener accelerometer 292, first and second inclinometers 294 and 296, respectively, and/or a hydraulic sensor 300, as hereinafter described). Actual mounting locations of the one or more sensors could include, for example, a lever arm mounted on a pivot point or a torsion/strain meter on a packer wheel axle. It is intended for the information sensed by the sensor array 411 to be used by the controller 414 to control the flow of hydraulic fluid to or from the hydraulic cylinder 228, and thus, the amount of down pressure force applied on the opener 232. More specifically, the amount of down force applied by the hydraulic cylinder 228 is substantially controlled by the controller 414 to maintain a desired depth 252 based on soil conditions, seeds, or environmental factors, among other considerations.

As hereinafter described, each sensor of the sensor array 411 provides a corresponding electrical output signal to an optional signal conditioning circuit 413, then, in turn, to a controller 414. The optional signal conditioning circuit 413 may provide electrical signal amplification, buffering, analog to digital conversion, and/or any other functionality to properly condition such electrical signals for use by the controller 414. The controller 414 may be a microprocessor, microcontroller, central processing unit (CPU), field programmable gate array (FPGA), programmable logic device (PLD), application specific integrated circuit (ASIC), or any other processing capable element. The controller 414 receives the electrical output signals and determines whether to open or close a valve 416 as needed to adjust pressure in the cylinder 228, and hence, the hydraulic down pressure force on the opener 232 of a corresponding row unit 218.

It is contemplated for the sensor array 411 of control system 411) to detect and/or measure a variety of characteristics, including frame acceleration, opener acceleration, frame angle, shank angle, hydraulic pressure, and/or loads or forces, such as between the gauge wheel and ground, and supply the corresponding signals to a controller 414. It can be appreciated that the agricultural system of the present invention may include other sensors without deviating from the scope of the present invention. By way of example, the sensor array 411 includes a strain gauge or load cell 278 is mounted to the packer atm 236. The load cell 278 may take the form of a transducer which generates an electrical signal whose magnitude is proportional to a physical force or strain being exerted on the packer wheel arm 236. The electrical, signal generated by load cell 278 may be provided directly to controller 414 or passed through an optional signal conditioning circuit. 413, as heretofore described, prior to receipt by the controller 414. In addition (or alternatively), a second strain gauge or load, cell 279 mounted adjacent a terminal end of the packer arm 236 proximal to the packer wheel 238. The second load, cell 279 may take the form of a transducer which generates an electrical signal whose magnitude is proportional to a physical force or strain being exerted on the packer wheel arm 236. The electrical signal generated by second load cell 279 may be provided directly to controller 414 or passed through an optional signal conditioning circuit 413, as heretofore described, prior to receipt by the controller 414.

The sensor array 411 also includes a frame accelerometer 290 mounted to the bracket 222. The frame accelerometer 290 generates an electrical signal whose magnitude corresponds to the acceleration of the frame of the implement 210 relative to the Earth's surface. The electrical signal generated by frame accelerometer 290 may be provided directly to controller 414 or passed through an optional signal conditioning circuit 413, as heretofore described, prior to receipt by the controller 414. Similarly, an opener accelerometer 292 is mounted to the second member 226 of the parallel linkage. The opener accelerometer 292 generates an electrical signal whose magnitude corresponds to the acceleration of the opener 232 relative to the Earth's surface. The electrical signal generated by opener accelerometer 292 may be provided directly to controller 414 or passed through an optional signal conditioning circuit 413, as heretofore described, prior to receipt by the controller 414. The frame accelerometer 290 and/or the opener accelerometer 292 may be conventional single axis accelerometers for detecting the magnitude and direction of the acceleration along a single axis or a multi-axis accelerometer for detecting the magnitude and the direction of acceleration along multiple axes. Detected acceleration may correspond to a "bounce" of the unit (frame or opener) as the unit travels.

A first inclinometer 294 of sensor array 411 is mounted to the frame support 220. The first inclinometer 294 generates an electrical signal corresponding to the angle of the frame support 220 relative to the earth. In addition, or alternatively, the first inclinometer 294 could also indicate when the opener is in a field or transport position and/or opener bounce (such as via motion of a link which corresponds to the opener/knife assembly). The electrical signal generated by the first inclinometer 94 may be provided directly to controller 414 or passed through an optional signal conditioning circuit 413, as heretofore described, prior to receipt by the controller 414.

A second inclinometer 296 of sensor array 411 is mounted to packer support plate 234. The second inclinometer 296 generates an electrical signal corresponding to the angle of the packer support plate 234. The electrical signal generated by the second inclinometer 296 may be provided directly to controller 414 or passed through an optional signal conditioning circuit 413, as heretofore described, prior to receipt by the controller 414.

In operation, an operator sets the opener 232 to a desired depth and sets the hydraulic down pressure force being exerted by cylinder 228 on the opener 232 to a desired value based on experience and field conditions. As the row unit 218 is initially lowered into the field engaging position and the opener 232 begin to cut furrows into the planting surface, the first and second load cells 278 and 278, respectively, the frame accelerometer 290, the opener accelerometer 292, the first and second inclinometers 294 and 296, respectively, and the hydraulic sensor 300 of sensor array 411 provide feedback to the controller 414 via electrical output signals from the various sensors, as heretofore described. The controller 414 analyzes the sensor data from the electrical output signals received to determine if adjustment of the hydraulic down pressure force being exerted by cylinder 228 on the opener 232 is required. Having multiple sensors of varying types may allow for more resolution of the opener operation. Generally, if the amount of down pressure applied by the cylinder 228 is excessive, the hydraulic down pressure force being exerted by cylinder 228 on the opener will force the hoe/knife opener 232 farther into the planting surface, thereby resulting in deformation, e.g., slight bending, of the packer wheel arm 238 and/or over-packing of the furrow by the packer wheel. This deformation of the packer wheel arm 238 is detected by one or more the various sensors, such as the first and second load cells 278 and 279, respectively. On the other hand, if the down pressure applied by the cylinder 228 is insufficient to hold the opener 232 at the desired furrow cutting depth, a reverse bending of the packer wheel arm 238 will occur and be detected by the one or more various sensors, such as the first and second load cells 278 and 279, respectively. In addition, or alternatively, the opener accelerometer 292, the first inclinometers 294, and/or the second inclinometers 296 could sense that there is insufficient down pressure based on an increased of movement.

As the opener 232 is pulled through the planting surface, the various sensors provide the controller 414 with the electrical output signals, as heretofore described. The controller 414 compares the sensor data from the electrical output signals to a range of "no-action" values. That is, if the amount of strain, acceleration, angle or pressure falls sensed within the range of "no-action" values set for the particular sensor, then the controller 414 will not effectuate a change to the amount of the hydraulic down pressure force being exerted by cylinder 228 on the opener 232. However, if the amount of strain, acceleration, angle or pressure falls sensed by the various sensors are outside the range of "no-action" values, the controller 414 will adjust, e.g., increase or decrease, the hydraulic down pressure force being exerted by cylinder 228 on the opener 232. The range of "no action" values is of sufficient size to avoid the constant changing of the hydraulic pressure exerted by cylinder 228, but avoids undesirable over-force or under-force on the opener 232.

In view of the foregoing, it can be appreciated that the information gathered from the first or second load cells 278 and 279, respectively, the frame accelerometer 290, the opener accelerometer 292, the first and second inclinometers 294 and 296, respectively, and/or the hydraulic sensor 300 may be used control the flow of hydraulic fluid to or from the hydraulic cylinder 228, and thus, the amount of down force applied on the opener 232. In this regard, the amount of down force applied by the hydraulic cylinder 228 can be substantially controlled to maintain the opener 232 at a desired depth at a variety of travel speeds conventional for an implement and under a variety of field conditions.

It is understood that the controller 414 could also provide monitoring and control capability to an operator located in the cab, such as a driver of the tractor 12, by sending the sensor array information to an input/output module 418 in the cab (such as a display), and receiving commands from the input/output module 418 in the cab (such as dials). Accordingly, the operator may set a desired depth and down force for opener 232 and/or a seeding speed. These could be set, for example, manually based on feedback indicated to the user, or automatically according to a controller, such as via an ISOBus control.

The controller 414 may relate data collected from the opener and the frame in making adjustments. For example, the controller 414 may compare parallel link and rockshaft inclinometer readings to determine how the opener assembly is reacting to the ground while operating in various conditions (which may allow a more precise adjustment of down pressure onto the assembly); the controller 414 may compare frame and opener (shank) accelerometer readings to determine how the opener assembly is reacting to the ground while operating in various conditions (which may allow a more precise adjustment of down pressure onto the assembly) and so forth, to provide a better determination of how the opener, in isolation, is reacting in the field, and thereby allow improved adjustment and control.

Figure 3:
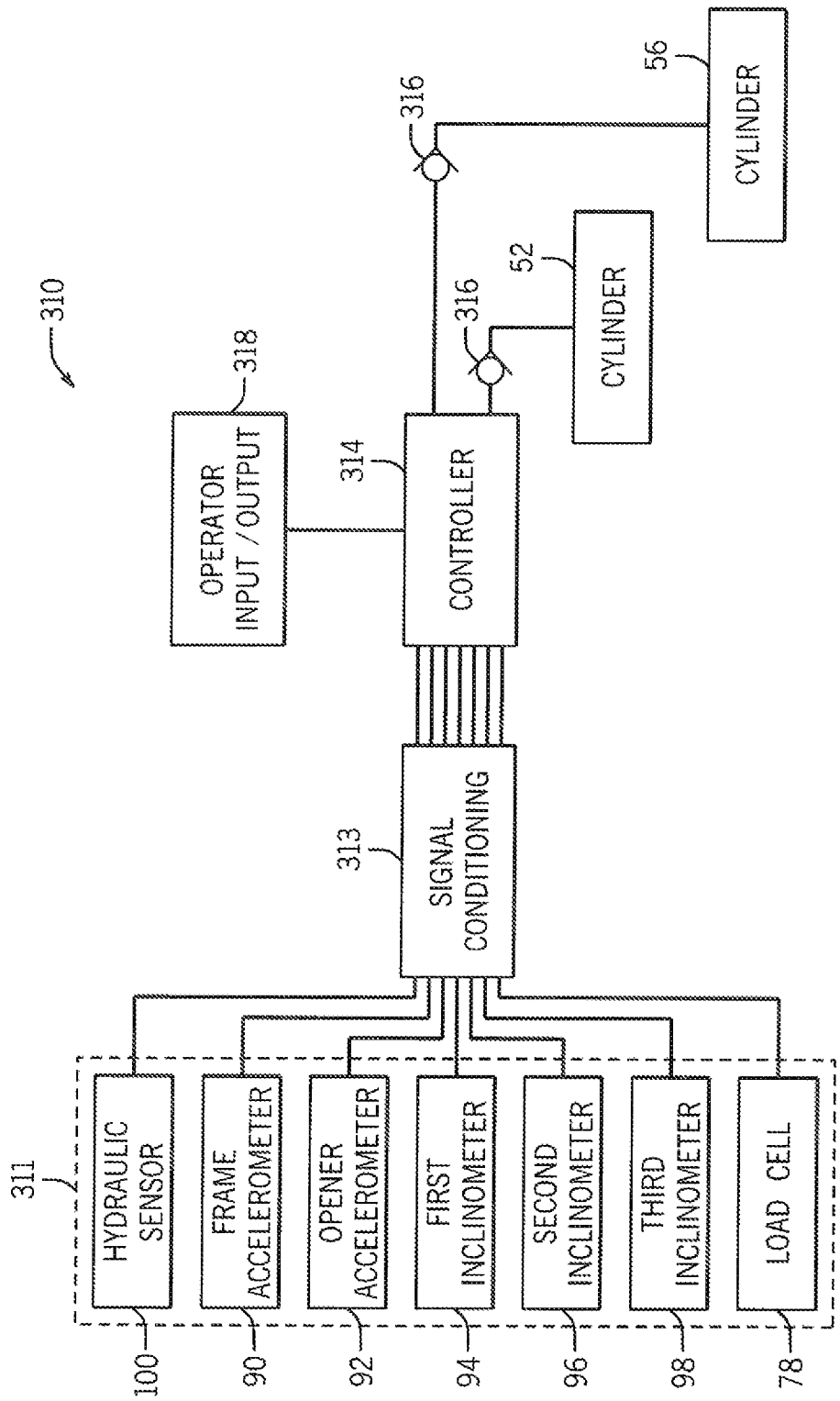
FIG. 3 is a schematic diagram of a down pressure adjustment circuit having a sensor array for use with the agricultural system(s) of FIGS. 1-3.
Figure 8:
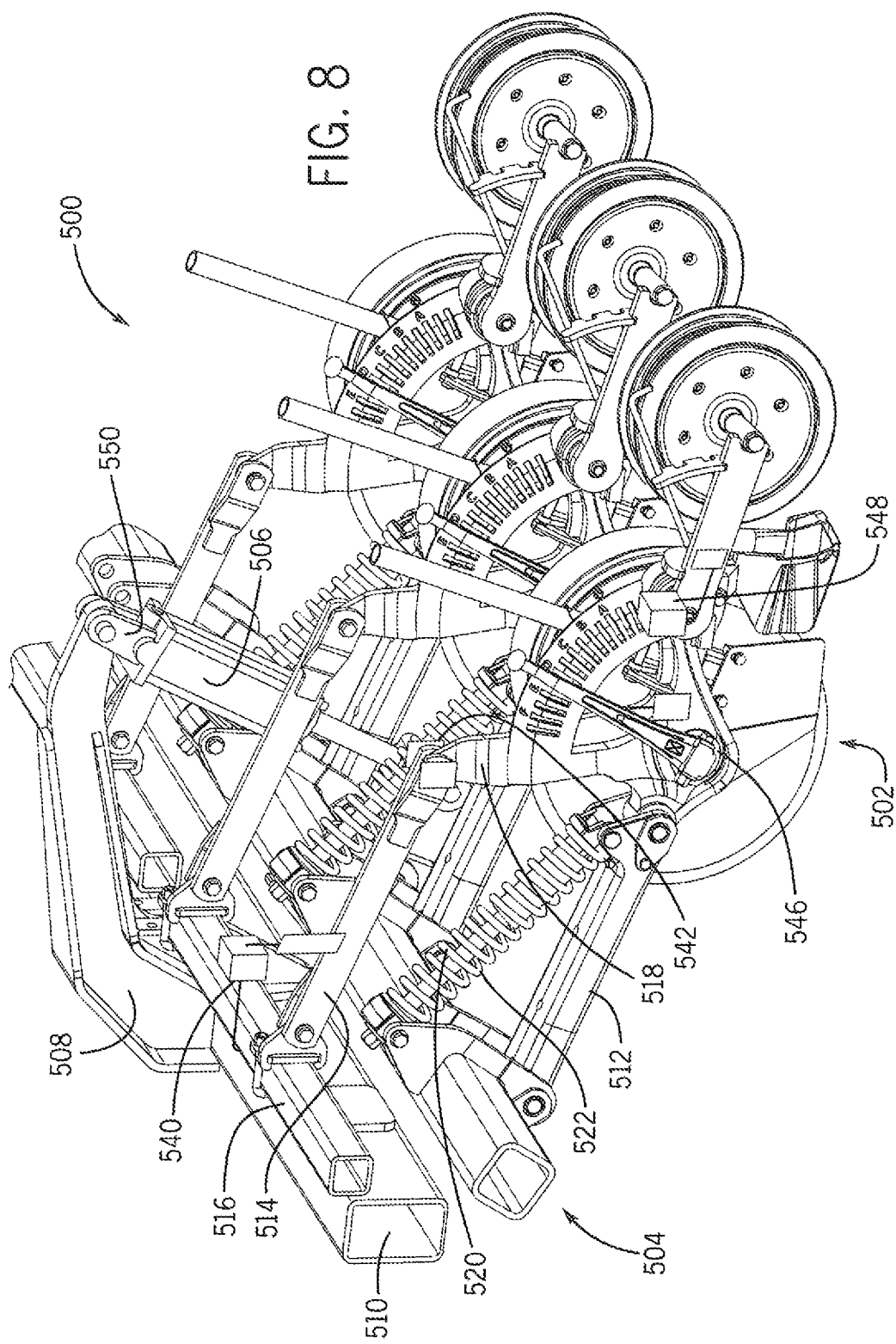
FIG. 8 is an isometric view of another implement using a rockshaft in accordance with the present invention.

FIG. 8 illustrates another type of row unit 500 wherein multiple disc openers 502 are ganged to a rockshaft 504. The rockshaft 504 is rotated by a hydraulic cylinder 506 that is coupled at one end to the rockshaft 504 and is coupled at the opposite end to a support arm 508 that is mounted to a tool bar 510 or other stationary frame member. Each of the disc openers 502 includes a linkage assembly generally comprised of an upper link 512 and a lower link 514. Upper link 512 may be coupled at one end directly to the tool bar 510, or as illustrated in FIG. 8, is coupled to a rail 516 that is mounted to the tool bar 510. The opposite end of the upper link 512 is coupled to the disc opener bracket 518 (or mounts). The lower link 514 is interconnected between the rockshaft 504 and the disc opener bracket 518. Also interconnected between the rockshaft 504 and the disc opener bracket 518 is a sleeve 520 which supports a spring 522. The spring 522 may be coupled to a trunnion at one end and coupled to the lower link 514 at its opposite end. The trunnion is free to slide along the sleeve 520 with rotation of the rockshaft 504. A stop is provided that sets a maximum on how far the spring 522 can be elongated when the rockshaft 504 is rotated counterclockwise (in the figure) by the hydraulic cylinder 506. It will thus be appreciated that as the rockshaft 504 is rotated clockwise (in the figure) by the cylinder 506, the springs 522 will compress and apply down pressure on the disc openers 502. In this aspect, as described above with respect to FIGS. 1-7, various sensors may be used, including: one or more rotary sensors 540 on parallel link arms; one or more accelerometers 544; one or more load cells 546; one or more rotary sensors 548 for determining packer angle; and a hydraulic pressure sensor 550. A control system may be used, including as described above with respect to FIGS. 3 and 7, to effect automatic and continuous down pressure adjustments, and/or the aforementioned sensors may be monitored by an operator to control settings.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A seeding implement, comprising:
   a frame;
   a linkage coupled to the frame;
   an opener coupled to the linkage for cutting a furrow into a ground surface;
   a down pressure mechanism operable to apply an adjustable down pressure onto the opener, the down pressure mechanism configured to exert a user settable down pressure onto the opener;
   a first inclinometer operatively connected to a pivot position of the linkage proximal to the frame, the first inclinometer configured to measure an angle of the linkage relative to the frame and provide corresponding electrical output signal;
   a second inclinometer operatively connected to a pivot position of the linkage proximal to the opener, the second inclinometer configured to measure an angle of the linkage relative to the opener and provide a corresponding electrical output signal; and
   a controller operatively connected to the first and second inclinometers for receiving the electrical output signals therefrom, the controller being configured to adjust the down pressure mechanism to the user set down pressure based on the electrical output signals.

2. The seeding implement of claim 1, further comprising a sensor providing an electrical output signal, the sensor configured to measure a sensed value related to at least one of the frame and the opener and wherein the controller is operatively connected to the sensor and receives the electrical output signal from the sensor.

3. The seeding implement of claim 2, wherein the sensor is a hydraulic pressure sensor operatively connected to the down pressure mechanism, the hydraulic pressure sensor being configured to measure the down pressure on the opener.

4. The seeding implement of claim 2, further comprising a depth setting arm operatively connected to the opener and operable to set a cutting depth for the opener, and wherein the sensor is a load sensor operatively connected to the depth setting arm and being configured to measure a strain value.

5. The seeding implement of claim 1, wherein the opener includes at least one of a cutting disc and a hoe.

6. The seeding implement of claim 1, wherein the controller is further configured to automatically adjust the down pressure mechanism to the user set down pressure according to a user specified range.

7. The seeding implement of claim 1, wherein the controller is further configured to receive feedback from an operator in the cab to manually adjust the user set down pressure.

8. A seeding implement, comprising:
   a frame;
   linkage pivotably coupled to the frame;
   an opener coupled to the linkage for cutting a furrow into a ground surface;
   a down pressure mechanism operatively connected to the opener, the down pressure mechanism being configured to exert a user settable down pressure onto the opener;
   a first inclinometer operatively connected to a pivot position of the linkage proximal to the frame for measuring an angle between the linkage and the frame and generating a first electrical output signal in response thereto;
   a second inclinometer operatively connected to a pivot position of the linkage proximal to the opener for measuring an angle between the linkage and the opener and generating a second electrical output signal in response thereto; and
   a controller operatively connected to the first and second inclinometers and receiving the first and second electrical output signals therefrom, the controller being configured to adjust the down pressure mechanism to the user set down pressure based on the first and second electrical output signals.

9. The seeding implement of claim 8, further comprising a first accelerometer operatively connected to the frame for measuring an acceleration of the frame and generating a third electrical output signal in response thereto, wherein the controller is operatively connected to the first accelerometer and receives the third electrical output signal therefrom.

10. The seeding implement of claim 9, further comprising a second accelerometer operatively connected to the opener for measuring an acceleration of the opener and generating a fourth electrical output signal in response thereto, wherein the controller is operatively connected to the second accelerometer and receives the fourth third electrical output signal therefrom.

11. The seeding implement of claim 8, further comprising a hydraulic pressure sensor operatively connected to the down pressure mechanism for measuring a down pressure and generating a third electrical output signal in response thereto.

12. The seeding implement of claim 8, further comprising a depth setting arm operatively connected to the opener and operable to set a cutting depth for the opener, and further comprising a load sensor operatively connected to the depth setting arm for measuring a strain value and generating a third electrical output signal in response thereto.

13. A down pressure adjustment system for a seeding implement including a frame, a linkage coupled to the frame, and an opener coupled to the linkage for cutting a furrow into a ground surface, the down pressure adjustment system comprising:
   a down pressure mechanism connectable to the opener for applying a user selected down pressure onto the opener;
   an accelerometer providing a first electrical output signal, the accelerometer configured to measure an acceleration of at least one of the frame and the opener;

a first inclinometer providing a second electrical output signal, the first inclinometer configured to measure an angle of at least one of the linkage relative to the frame;

a second inclinometer providing a third electrical output signal, the second inclinometer configured to measure an angle of at least one of the linkage relative to the opener; and a controller receiving the first, second and third electrical output signals, wherein the controller is configured to adjust the down pressure mechanism to the user set down pressure based on the first, second and third electrical output signals.

14. The down pressure adjustment system of claim 13, further comprising a hydraulic pressure sensor operatively connected to the down pressure mechanism for measuring a down pressure and generating a fourth electrical output signal in response thereto.

15. The down pressure adjustment system of claim 14, further comprising a load sensor operatively connected to a depth setting arm of the opener for measuring a strain value and generating a fifth electrical output signal in response thereto.

16. The down pressure adjustment system of claim 13, wherein the controller is further configured to automatically adjust the down pressure mechanism to the user set down pressure according to a user specified range.

17. The down pressure adjustment system of claim 13, wherein the controller is further configured to receive feedback from an operator in the cab to manually adjust the user set down pressure.

18. The seeding implement of claim 2, wherein the sensor is a first accelerometer operatively connected to the frame, and further comprising a second accelerometer operatively connected to the opener, wherein the first accelerometer is configured to measure an acceleration of the frame and the second accelerometer is configured to measure an acceleration of the opener.

* * * * *